United States Patent [19]

Nelle

[11] Patent Number: 4,475,289

[45] Date of Patent: Oct. 9, 1984

[54] ERROR CORRECTION SYSTEM FOR POSITION MEASURING DEVICE

[75] Inventor: Guenther Nelle, Bergen, Fed. Rep. of Germany

[73] Assignee: Dr. Johannes Heidenhain GmbH, Traunreut, Fed. Rep. of Germany

[21] Appl. No.: 476,529

[22] Filed: Mar. 18, 1983

[30] Foreign Application Priority Data

Mar. 25, 1982 [DE] Fed. Rep. of Germany ....... 3210962

[51] Int. Cl.³ ............................................. G01B 11/04
[52] U.S. Cl. ............................. 33/125 C; 250/237 G
[58] Field of Search ............ 33/125 R, 125 A, 125 C, 33/125 T, DIG. 3; 250/237 G

[56] References Cited

U.S. PATENT DOCUMENTS

| 226,162 | 4/1880 | Darling | 74/27 |
|---|---|---|---|
| 4,169,316 | 10/1979 | Ernst | 33/125 C |
| 4,170,828 | 10/1979 | Ernst | 33/125 C |
| 4,273,447 | 6/1981 | Nelle | 33/125 C |
| 4,295,742 | 10/1981 | Nelle et al. | 33/125 C |

FOREIGN PATENT DOCUMENTS

| 853657 | 10/1952 | Fed. Rep. of Germany . |
| 2724858 | 11/1979 | Fed. Rep. of Germany . |
| 2820753 | 3/1980 | Fed. Rep. of Germany . |
| 2037431 | 7/1980 | United Kingdom ............. 33/125 R |

Primary Examiner—Richard R. Stearns
Attorney, Agent, or Firm—Willian, Brinks, Olds, Hoffer, Gilson & Lione Ltd.

[57] ABSTRACT

A length or angle measuring device is provided with an error correction system in which the scanning unit, or the division plane of the scanning element of the scanning unit, is rotatable through an angle $\phi$ with respect to the division plane of the measuring scale in accordance with the desired error course. Preferably, the tilt axis of the scanning unit is maintained at a parallel spacing a from the division plane of the scale, perpendicular to the measuring direction X and parallel to the scale.

7 Claims, 6 Drawing Figures

ERROR CORRECTION SYSTEM FOR POSITION MEASURING DEVICE

BACKGROUND OF THE INVENTION

The present invention relates to an error correction system for a position measuring device of the type used to measure the relative position between first and second objects, wherein a measuring scale is coupled to move with the first object and a scanning unit is coupled to move with the second object to scan the scale.

A variety of such error correction systems for position measuring devices are known to the art.

For example, in German Pat. No. 853657, there is described an optical measuring device in which a plate is swingable in a beam path in correspondence to the desired error correction.

In German Pat. No. 27 24 858, a length measuring device is described which includes an error correction system that incorporates a link chain. The individual links of this chain are adjustable transversely with respect to the measuring direction in accordance with the desired error course. A transfer element is provided which scans the link chain and brings about a correcting relative movement in the measuring direction between a scanning unit and a scale included in the measuring device. In the disclosed device, the scanning unit is guided for parallel movement with respect to the division plane of the scale.

German Pat. No. 28 20 753 discloses an error correction system in a length measuring device in which an error correction profile is formed as an integral part of a housing for a scale. This profile is scanned by means of a transfer element and brings about a correcting relative movement in the measuring direction between a scanning unit and a scale included in the measuring device. As above, this scanning unit is guided for parallel movement with respect to the division plane of the scale.

In the correction systems described above, the transfer elements which take the form of swingable angle elements are subject to mechanical wear, and they can result in substantially increased cross-sectional dimensions of the position measuring device. Such an increase in cross-sectional size can be detrimental to a flexible use of the measuring device.

SUMMARY OF THE INVENTION

The present invention is directed to an improved error correction system for use in a position measuring device, in which the need for mechanical elements can be reduced and which can be installed directly in commercially utilized position measuring devices without substantial structural modifications.

According to this invention, an error correction system for a measuring device of the type described above is provided which comprises means for mounting at least a portion of the scanning unit (which portion comprises a scanning element) for tilting motion with respect to the measuring division plane defined by the measuring scale. In addition, means are provided for tilting the at least a portion of the scanning unit to vary the angular orientation of the scanning element with respect to the measuring division plane in correspondence with a desired error correction course, in order to bring about the desired error correction of the position of the scanning element with respect to the scale.

This invention provides the important advantages that the proposed error correction system requires no expensive mechanical elements, and a simple, economical construction can be utilized to minimize the cost of the position measuring device. Because parts subject to wear have been minimized, the system can be embodied in correction devices of small physical size, and dependable and flexible operation is assured.

The error correction system of this invention can be used for the correction of both linear and nonlinear errors, substantially independently of the measuring length. Further advantageous features of this invention are set forth in the attached dependent claims.

The invention itself, together with further objects and attendant advantages, will best be understood by reference to the following detailed description taken in conjunction with the accompanying drawings.

BRIEF DESCRIPTION OF THE DRAWINGS

FIG. 1b is a cross-sectional view in partial cutaway taken along line 1b—1b of FIG. 1a.

FIG. 2b is a cross-sectional view in partial cutaway taken along line 2b—2b of FIG. 2a.

FIG. 3b is a cross-sectional view taken along line 3b—3b of FIG. 3a.

DETAILED DESCRIPTION OF THE PRESENTLY PREFERRED EMBODIMENTS

Figure 1A:
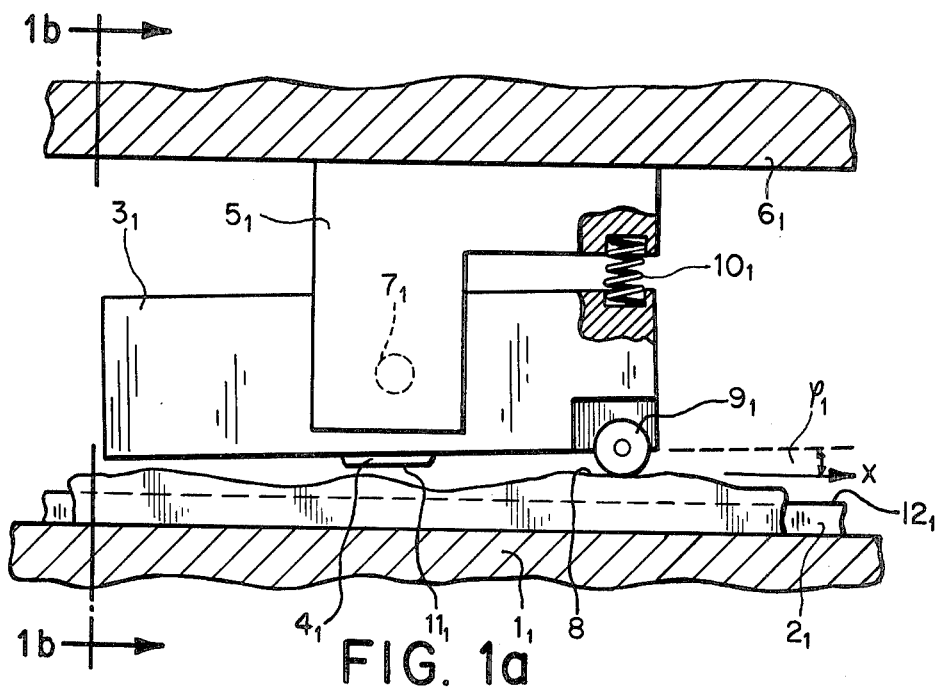
FIG. 1a is a side elevational view in partial cutaway of a length measuring system which incorporates a first preferred embodiment of this invention.
Figure 1B:
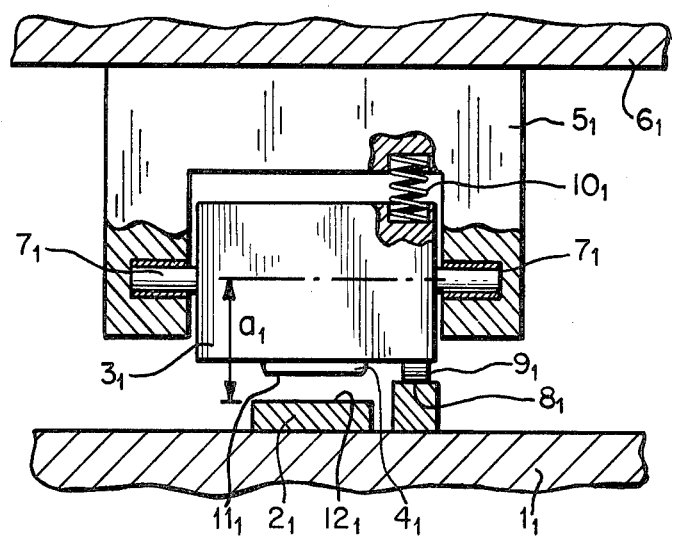

Turning now to the drawings, FIG. 1a and 1b represent two views of a length measuring instrument which incorporates a first preferred embodiment of the present invention. In FIG. 1a and 1b, a scale $2_1$ is mounted to a bed $1_1$ of a machine (not shown). For example, the scale $2_1$ can be secured to the bed $1_1$ by a suitable adhesive. The division of the scale $2_1$ is scanned by means of a scanning element or plate $4_1$, an illuminating arrangement (not shown), and a plurality of photosensers (not shown) included in a scanning unit $3_1$. The scanning unit $3_1$ is connected to a follower $5_1$ which is in turn securely fastened to a slide piece $6_1$ of the machine. In order to correct for errors, such as division errors and/or machine errors, in the measurement of the relative position between the slide piece $6_1$ and the bed $1_1$ of the machine, the scanning unit $3_1$ is mounted to the follower $5_1$ by means of an axis or axle $7_1$ such that the scanning unit $3_1$ is rotatable about the axis $7_1$. Alongside the scale $2_1$ there is mounted to the bed $1_1$ of the machine an error correction profile $8_1$. This profile $8_1$ is scanned by a roller $9_1$ rotatably mounted to the scanning unit $3_1$. A spring $10_1$ is interposed between the scanning unit $3_1$ and the follower $5_1$ to bias the roller $9_1$ against the profile $8_1$. During the measuring process as the scanning unit $3_1$ moves along the scale $2_1$, the division plane $11_1$ of the scanning plate $4_1$ tilts about the axis $7_1$ such that a variable angle $\phi_1$ is created between the division plane $11_1$ of the scanning plate $4_1$ and the division plane $12_1$ of the scale $2_1$. The axis $7_1$ is maintained at a constant distance or separation $a_1$ from the division plane $12_1$ of the scale $2_1$. The measuring value obtained by the scanning unit $3_1$ is corrected by an amount equal to $a_1 \cdot \phi_1$ in the measuring direction X according to the desired error course. The axis $7_1$ runs at a parallel spacing $a_1$ from the division plane $12_1$, parallel to the division plane $12_1$ and perpendicular to the measuring direction X. By providing an appropriate contour to the profile $8_1$, the entire scanning unit $3_1$ can be tilted as desired about the axis $7_1$ in order to vary the position of the scanning element $4_1$ with respect to the scale $2_1$ in the measuring direction X in order to bring about the desired correction.

Figure 2A:
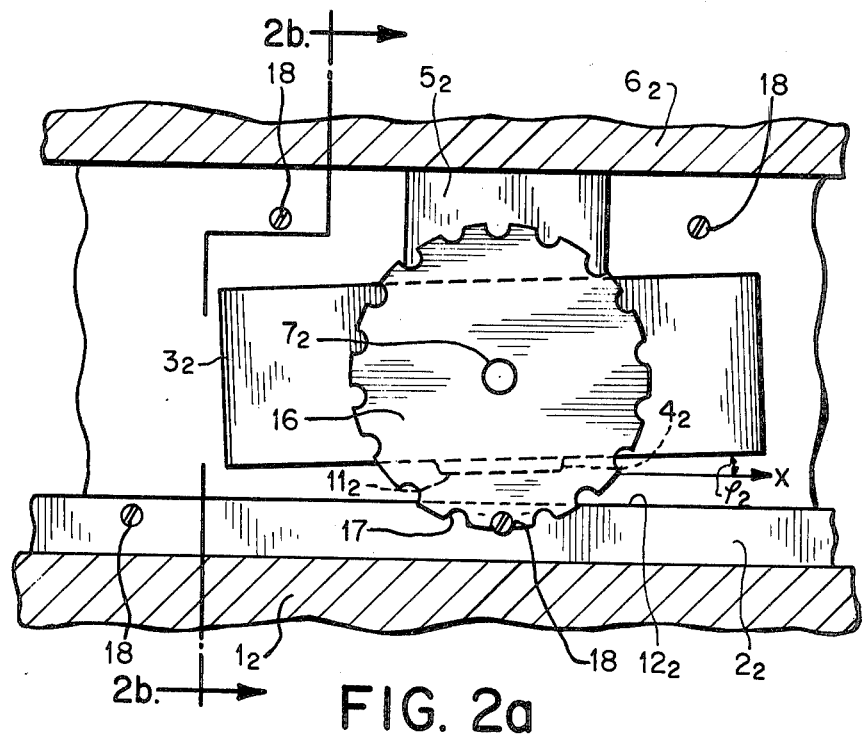
FIG. 2a is a side elevational view of a portion of a length measuring instrument which incorporates a second preferred embodiment of this invention.
Figure 2B:
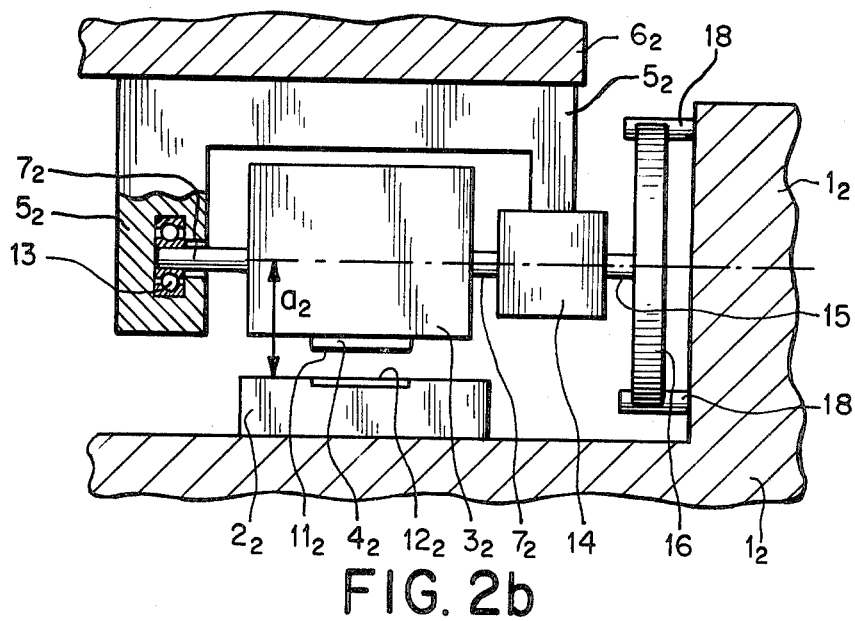

Turning to FIG. 2a and 2b, these figures represent two views of a length measuring device which incorporates a second preferred embodiment of this invention. In this embodiment, a scale $2_2$ is fastened to a bed $1_2$ of a machine (not shown), as for example by a suitable adhesive. The division of the scale $2_2$ is scanned by a scanning unit $3_2$ by means of a scanning plate $4_2$ and (in a manner not shown) by means of an illuminating system and the plurality of photosensors. The scanning unit $3_2$ is mounted on a follower $5_2$ which is rigidly fastened to a slide piece $6_2$ of the machine. In order to correct for errors in the measurement of the relative position between the slide piece $6_2$ and the bed $1_2$ of the machine, the scanning unit $3_2$ is mounted by means of an axis $7_2$ and a bearing 13 so as to rotate with respect to the follower $5_2$. This axis $7_2$ is connected to a reducing gear 14 which is fastened to the follower $5_2$. The reducing gear 14 is connected by means of a shaft 15 with a setting wheel 16. The setting wheel 16 defines along its circumference a plurality of equidistant recesses 17. In addition, a plurality of setting bolts 18 are mounted on the bed $1_2$ so as to engage the recesses 17 of the setting wheel 16 at diametrically opposed positions. As the scanning unit $3_2$ is carried along the scale $2_2$, various ones of these setting bolts 18 engage respective recesses 17 in the setting wheel 16, thereby rotating the setting wheel 16 forward or backward in accordance with the desired error course. As is shown in FIG. 2a, each of the upper setting bolts 18 operates to rotate the setting wheel 16 in a counterclockwise direction by one recess 17 as the scanning unit $3_2$ moves from left to right, and each of the lower setting bolts 18 serves to rotate the setting wheel 16 in a clockwise direction by one recess 17 as the scanning unit $3_2$ moves from left to right. In this way, the scanning unit $3_2$ and the division plane $11_2$ of the scanning plate $4_2$ are rotated about the axis $7_2$ by a variable angle $\phi_2$ with respect to the division plane $12_2$ of the scale $2_2$. The center line of the axis $7_2$ is maintained at a constant distance or separation $a_2$ from the division plane $12_2$ of the scale $2_2$. For this reason, a measuring value correction in the amount of $a_2 \cdot \phi_2$ is obtained in accordance with the desired error course in the measuring direction X. By suitably positioning the setting bolts 18, the rotational orientaton of the scanning unit $3_2$ about the axis $7_2$ can be varied as desired in order to obtain the desired correction in the X direction of the position of the scanning plate $4_2$ with respect to the scale $2_2$.

Figure 3A:
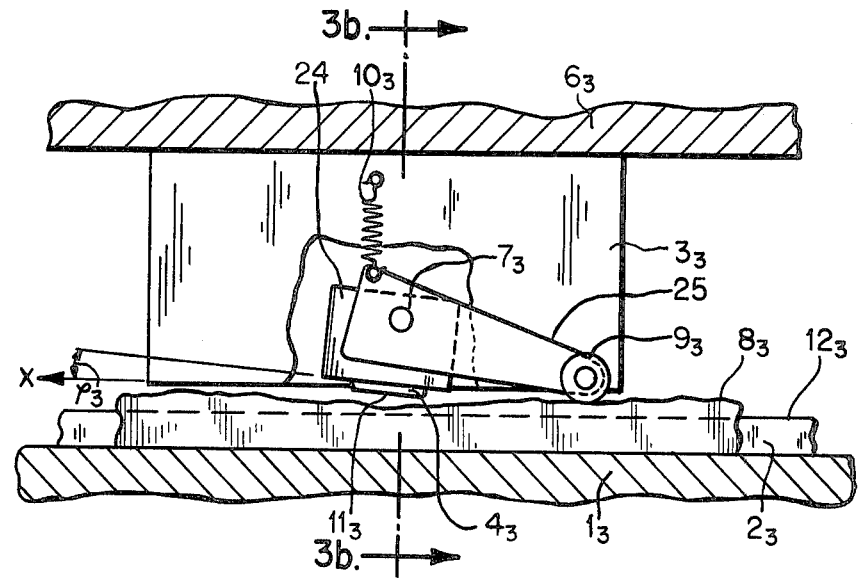
FIG. 3a is a side elevational view in partial cutaway of a portion of a length measuring instrument which incorporates a third preferred embodiment of this invention.
Figure 3B:
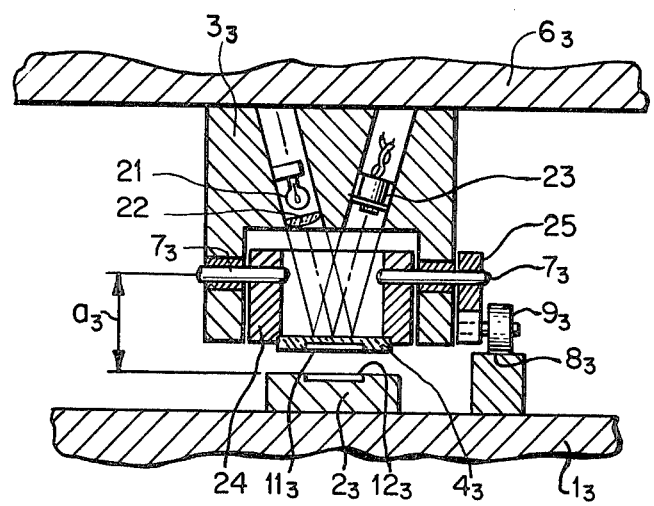

FIGS. 3a and 3b provide two views of a third length measuring system which incorporates a third preferred embodiment of this invention. This system includes a scale $2_3$ which is mounted to a bed $1_3$ of the machine (not shown), as for example by a suitable adhesive. The division of this scale $2_3$ is scanned by means of an illuminating arrangement in the form of a lamp 21 and a condenser 22, a scanning plate $4_3$, and a plurality of photosensors 23. In this embodiment, the scanning unit $3_3$ is rigidly fastened to a slide piece $6_3$ of the machine. The lamp 21, the condenser 22 and photosensors 23 are physically mounted in the scanning unit $3_3$. In order to provide for correction of the relative position between the slide piece $6_3$ and the bed $1_3$ of the machine during the measuring process, the scanning plate $4_3$ is mounted on a carrier 24. This carrier 24 is rotatably mounted to the scanning unit $3_3$ by means of an axis $7_3$. Alongside the scale $2_3$, an error correction profile $8_3$ is fastened to the bed $1_3$ of the machine. This profile $8_3$ is scanned by means of a roller $9_3$ which is mounted on one end of a lever 25, which is rigidly connected to the axis or shaft $7_3$ at one end to rotate about the axis $7_3$. A spring $10_3$ is mounted between the lever 25 and the scanning unit $3_3$ to bias the roller $9_3$ against the profile $8_3$. During the measuring process, as the scanning unit $3_3$ moves along the scale $2_3$, the division plane $11_3$ of the scanning plate $4_3$ is tilted in accordance with the desired error course with respect to the division plane $12_3$ of the scale $2_3$. The angle $\phi_3$ therebetween is therefore a variable angle which varies in accordance with the contour of the error correction profile $8_3$. The centerline of the shaft $7_3$ is maintained at a constant separation $a_3$ from the division plane $12_3$ of the scale $2_3$. For this reason, a measuring value correction in the amount of $a_3 \cdot \phi_3$ is obtained, corresponding to the desired error correction in the measuring direction X. In this embodiment, the axis $7_3$ is maintained at a parallel spacing $a_3$ from the division plane $12_3$, parallel to the measuring plane $12_3$ and perpendicular to the measuring direction X.

Preferably, the tilt axis $7_1$, $7_2$, $7_3$, is in each case oriented in the plane of symmetry which is perpendicular to the scanning plate $4_1$, $4_2$, $4_3$, and perpendicular to the measuring direction X.

In a manner not shown, the tilt axis of the scanning unit or scanning element can be formed by means of two guide rollers in order to guide the scanning unit on guide surfaces of the scale or on guide surfaces defined by a housing for the scale.

Of course, it should be understood that a wide range of changes and modifications to the preferred embodiments described above will be apparent to those skilled in the art. For example, the invention is not restricted to photoelectric measuring systems as shown above, but is also usable in connection with optical, magnetic, inductive, and capacitive measuring systems. It is therefore intended that the foregoing detailed description be regarded as illustrative rather than limiting, and that it be understood that is the following claims, including all equivalents, which are intended to define the scope of this invention.

I claim:

1. In a position measuring device for measuring the relative position between first and second objects, of the type comprising a measuring scale coupled to move with the first object and a scanning unit coupled to move with the second object to scan the scale, wherein the measuring scale defines a measuring division plane and wherein the scanning unit comprises at least one scanning element, the improvement comprising:

means for mounting the measuring scale and at least a portion of the scanning unit to accommodate a tilt angle between the at least a portion of the scanning unit and the measuring division plane, said at least a portion of the scanning unit comprising the scanning element; and means for controlling the tilt angle between the at least a portion of the scanning unit and the scale to vary the angular orientation of the scanning element with respect to the measuring division plane in correspondence with a desired error correction course in order to bring about a desired error correction of the position of the scanning element with respect to the scale.

2. The invention of claim 1 wherein the scale defines a measuring direction and wherein the mounting means comprises:

means for defining a rotational axis oriented parallel to the measuring division plane and perpendicular to the measuring direction, wherein the axis is spaced from the measuring division plane by a distance; and means for mounting the at least a portion of the scanning unit for rotation about the axis.

3. The invention of claim 2 wherein the tilt angle controlling means comprises:

an error correction profile; and a transfer element mounted to scan the profile and coupled to the at least a portion of the scanning unit to tilt the at least a portion of the scanning unit in response to the error correction profile.

4. The invention of claim 3 wherein the transfer element comprises a roller positioned to scan the profile.

5. The invention of claim 2 wherein the tilt angle controlling means comprises:

a plurality of setting bolts mounted alongside the scale; and a setting member coupled to the at least a portion of the scanning unit and positioned to engage the setting bolts such that the setting bolts rotate the setting member and thereby tilt the at least a portion of the scanning unit.

6. The invention of claim 5 wherein the means for defining an axis comprises an axle, wherein the setting member is mounted to the axle, and wherein the setting member defines a plurality of circumferential recesses positioned to engage the setting bolts.

7. The invention of claim 2 wherein the axis is oriented perpendicular to the measuring direction in the plane of symmetry perpendicular to the scanning element.

* * * * *